Figure 1:
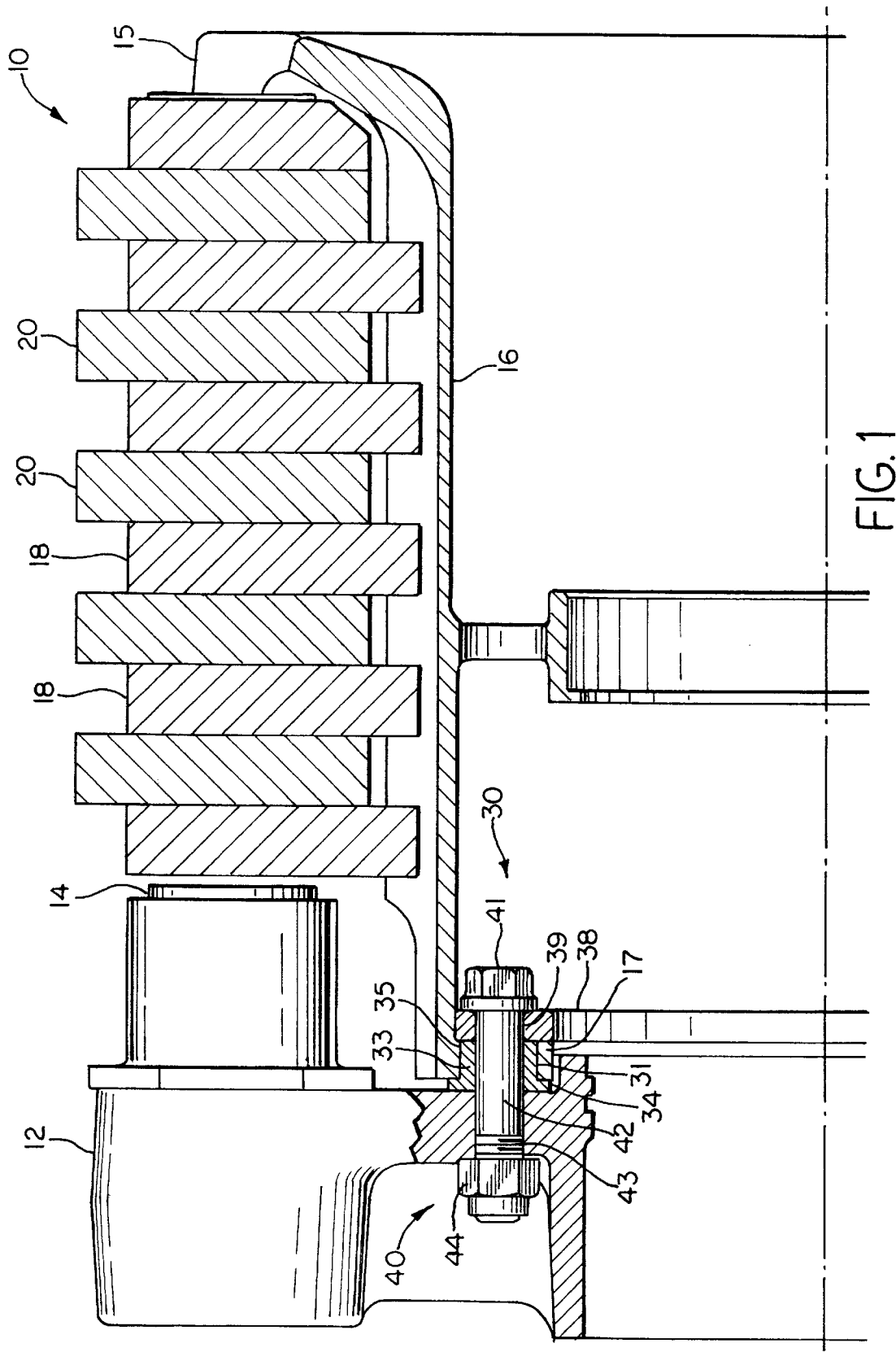

United States Patent [19]
Berwanger

[11] Patent Number: 5,908,091
[45] Date of Patent: Jun. 1, 1999

[54] MULTI-DISC BRAKE WITH VIBRATION DAMPING

[75] Inventor: Fred William Berwanger, South Bend, Ind.

[73] Assignee: AlliedSignal Inc., Morristown, N.J.

[21] Appl. No.: 08/910,833

[22] Filed: Aug. 13, 1997

[51] Int. Cl.⁶ .................................................... F16D 55/36
[52] U.S. Cl. ...................................... 188/71.5; 188/73.35
[58] Field of Search .................................. 188/71.5, 18 A, 188/206 R, 73.35, 73.36, 73.37, 73.38; 192/70.17, 70.16, 112; 244/110 A

[56] References Cited

U.S. PATENT DOCUMENTS

| | | | |
|---|---|---|---|
| 5,255,761 | 10/1993 | Zaremsky | 188/71.5 |
| 5,437,352 | 8/1995 | Harker | 188/71.5 |
| 5,494,138 | 2/1996 | Scelsi et al. | 188/71.5 X |
| 5,540,305 | 7/1996 | Hammond et al. | 188/71.5 |

Primary Examiner—Lee W. Young
Attorney, Agent, or Firm—Larry J. Palguta; Robert Desmond

[57] ABSTRACT

A multi-disc brake comprises a piston housing (12) attached to a torque tube (16), a plurality of stator discs (18) engaging the torque tube (16) and a plurality of rotor discs (20) positioned about the torque tube (16) for engagement with a wheel. The torque tube (16) includes a flange (17) having a plurality of over-sized openings (31) with each opening (31) receiving therein a bushing (33, 55). A fastener (40) comprising a nut (44) and bolt (40) extends through each over-sized opening (31) and bushing (33, 55), and compresses a bearing plate (38, 48) against the bushing (33, 55) which is captured between the bearing plate (38, 48) and piston housing (12). The slightly over-sized openings (31) in the torque tube flange (17) allow tangential and radial slippage at the area where the torque tube flange (17) contacts the bearing plate (38, 48) during braking, so as to dampen vibrations which occur during braking. The bearing plate (48) may be segmented into arcuate segments (48a, 48b, 48c). Additionally, a resilient mechanism (56) may be disposed between the torque tube (16) and piston housing (12) to provide a constant preload.

9 Claims, 3 Drawing Sheets

MULTI-DISC BRAKE WITH VIBRATION DAMPING

The present invention relates generally to a multi-disc brake having vibration damping, and in particular to an aircraft multi-disc brake having squeal modes of vibration damping.

Multi-disc brakes have been used as aircraft brakes for many years. Typically, the multi-disc brake comprises a piston housing attached by a plurality of nuts and bolts to a flange of the torque tube, the torque tube engaging stator discs of the brake and interspersed betwen the stator discs are rotor discs disposed about the torque tube for engagement with a surrounding wheel. During brake actuation, braking torque is transmitted from the stator discs to the torque tube and the piston housing. Vibration occurring at the braking interface can be transmitted to the piston housing via the torque tube such that undesirable squeal modes of vibration are amplified by the brake srructure. It is highly desirable to provide a brake which effects damping of vibrations that occur during braking, so as to protect the brake structure from damage, and to eliminate undesirable noise and vibrations that may be imparted to the aircraft. The present invention provides solutions to the above by providing a multi-disc brake with vibration damping, comprising a piston housing connected with a torque tube, a first set of friction discs engaged with the torque tube, a second set of friction discs for engagement with a wheel, the torque tube connected to the piston housing by a plurality of fastening mechanisms, the fastening mechanisms each comprising a fastener extending through openings in a bearing plate, a bushing, and the piston housing, each opening in the torque tube receiving therein a respective bushing with the torque tube opening being larger than the bushing, the fastener compressing the bearing plate against the bushings which engage the piston housing and the bearing plate engaging the torque tube, whereby the larger openings in the torque tube permit slippage between the torque tube and bearing plate in order to dampen vibration during braking.

Figure 2:
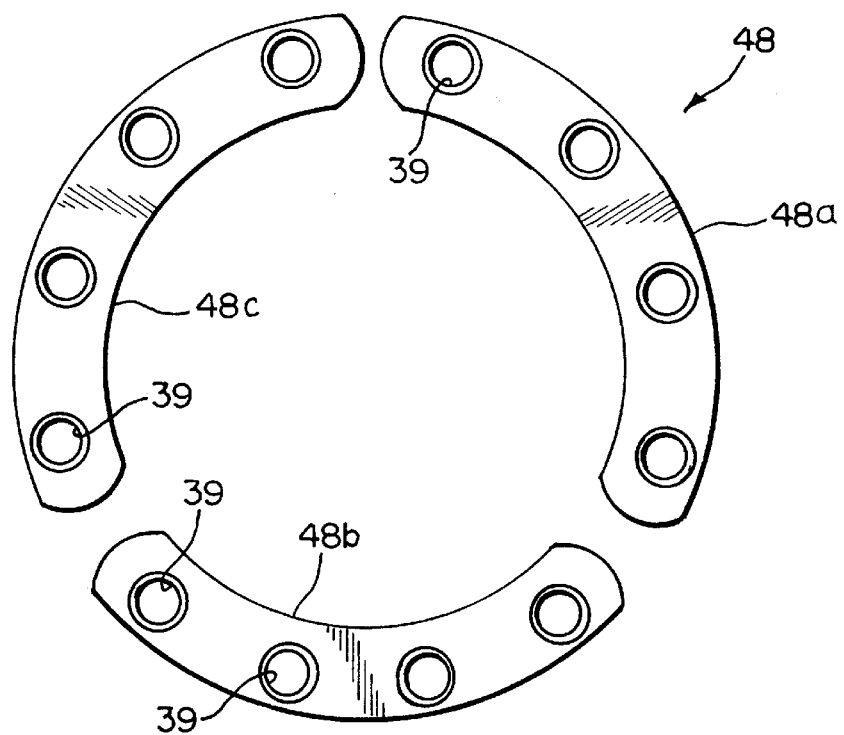
Figure 3:
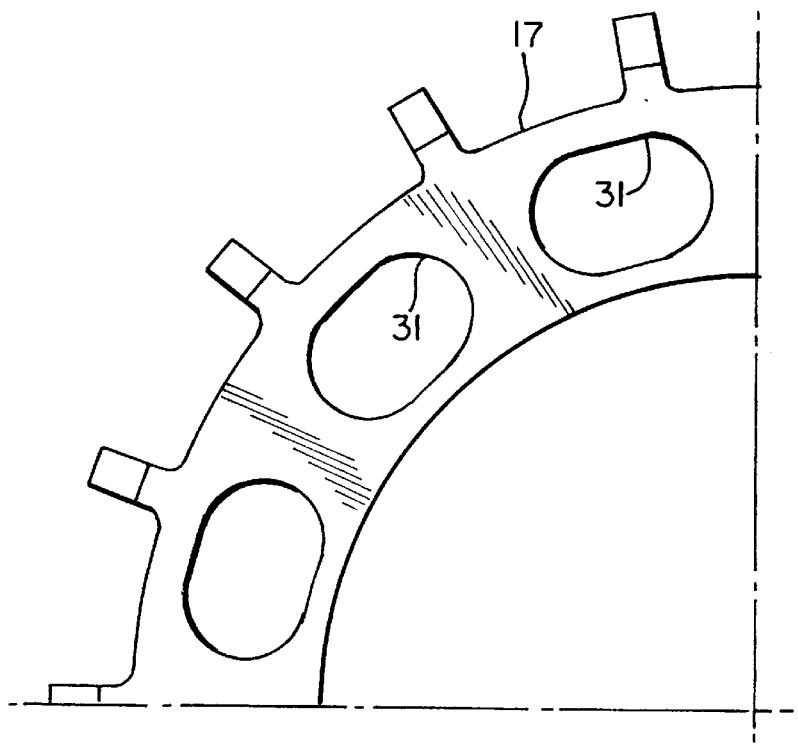

The invention is described in detail below with reference to the drawings which illustrate embodiments in which:

FIG. 1 is a section view of a multi-disc aircraft brake;
FIG. 2 is a plan view of a multi-segment bearing plate;
FIG. 3 is an end view of the torque tube flange; and
FIG. 4 is a partial section view of a multi-disc brake having a further embodiment of the present invention.

FIG. 1 illustrates an aircraft multi-disc brake designated generally by reference numeral 10. Brake 10 includes a piston housing 12 having therein a plurality of hydraulically operated pistons 14, and a torque tube 16 which is engaged by a plurality of stator friction discs 18, in this case carbon-carbon composite friction discs. A plurality of carbon-carbon composite rotor friction discs 20 are disposed about the torque tube for engagement with a surrounding wheel (not shown). The torque tube is attached to the piston housing 12 by a plurality of fastening mechanisms designated generally by reference numeral 30. Fastening mechanisms 30 comprise the torque tube flange 17 which includes therein a plurality of slightly over-sized openings 31 that may comprise either circular shaped openings or elongated shaped openings as illustrated in FIG. 3. Received within over-sized openings 31 are bushings 33 each of which includes a bushing flange 34 and a bushing shaft 35. The flange or brim 34 of the bushing 35 prevents the torque tube flange 17 from abrading on the piston housing 12. Abutting against the bushing shaft 35 is a bearing plate 38 having therein a plurality of openings 39. A plurality of fasteners 40 comprise bolts having bolt heads 41, bolt shafts 42, and bolt threads 43 receiving thereon threaded nuts 44. The fasteners 40 engage the bearing plate 38 which engages the bushing shafts 35 such that the bushing flanges 34 engage the piston housing 12. The bushings 35 are compressed or held tightly between the piston housing 12 and bearing plate 38, with the torque tube being held axially in place by the engagement of the bearing plate 38 with the torque tube flange 17, such that the bushings 35 receive the compressive load of the fasteners 40.

The invention described herein provides a damping interface between the two primary brake masses comprising the torque tube 16 and the piston housing 12. During braking when the pistons 14 are extended by hydraulic pressure to compress the rotating rotor discs between the stationary stator discs, braking torque is transmitted through the damped connection to the piston housing. Because brake vibration levels are typically somewhat proportional to torque levels, and torque is proportional to brake actuation force, the damping interface can resist the amplification and propogation of brake vibration at varying torque levels. This occurs because the preload of the fasteners 40 is borne by the localized compression of the bearing plate 38 and the bushings 33 whereby these components are rigidly clamped to the piston housing 12, but the torque tube flange 17 is not preloaded. The axial loading occurring during brake actuation force (the pistons compress together the stator discs and rotor discs between the extended pistons and the torque tube backing plate 15) effects a resultant force that is received by the bearing plate 38 via the torque tube flange 17a. The brake torque load in the circumferential direction of the brake due to the compression of the stationary stator discs with the rotating rotor discs, is transferred from the over-sized holes 31 and the bearing plaate 38 to the bushings 35, fasteners 40 and piston housing 12. During the onset of vibration, the slightly over-sized openings 31 in the torque tube flange 17 permit tangential and radial slippage at the area where the torque tube flange 17 contacts the bearing plate 38, which tends to interrupt tangential vibration. As illustrated in FIG. 2, the bearing plate may comprise a segmented bearing plate 48 comprising three segments 48a, 48b and 48c each having therein the openings 39 for receiving the fasteners 40. The segmenting of the bearing plate 48 facilitates installation of the plate inside the torque tube. The size of the over-sized openings 31 (FIG. 3) in the torque tube flange 17 relative to the diameters of the bushings 35 is determined by the maximum displacement of the torque tube vibration to be damped, plus manufacturing tolerance stack-up allowing such displacement at each bushing, but limited by the increase in the bearing stress peaking factor as hole over-size increases. The use of elongated openings 31 for the over-sized openings or holes permits greater tangential displacement of the torque tube while maintaining bearing contact area on the bushings.

Figure 4:
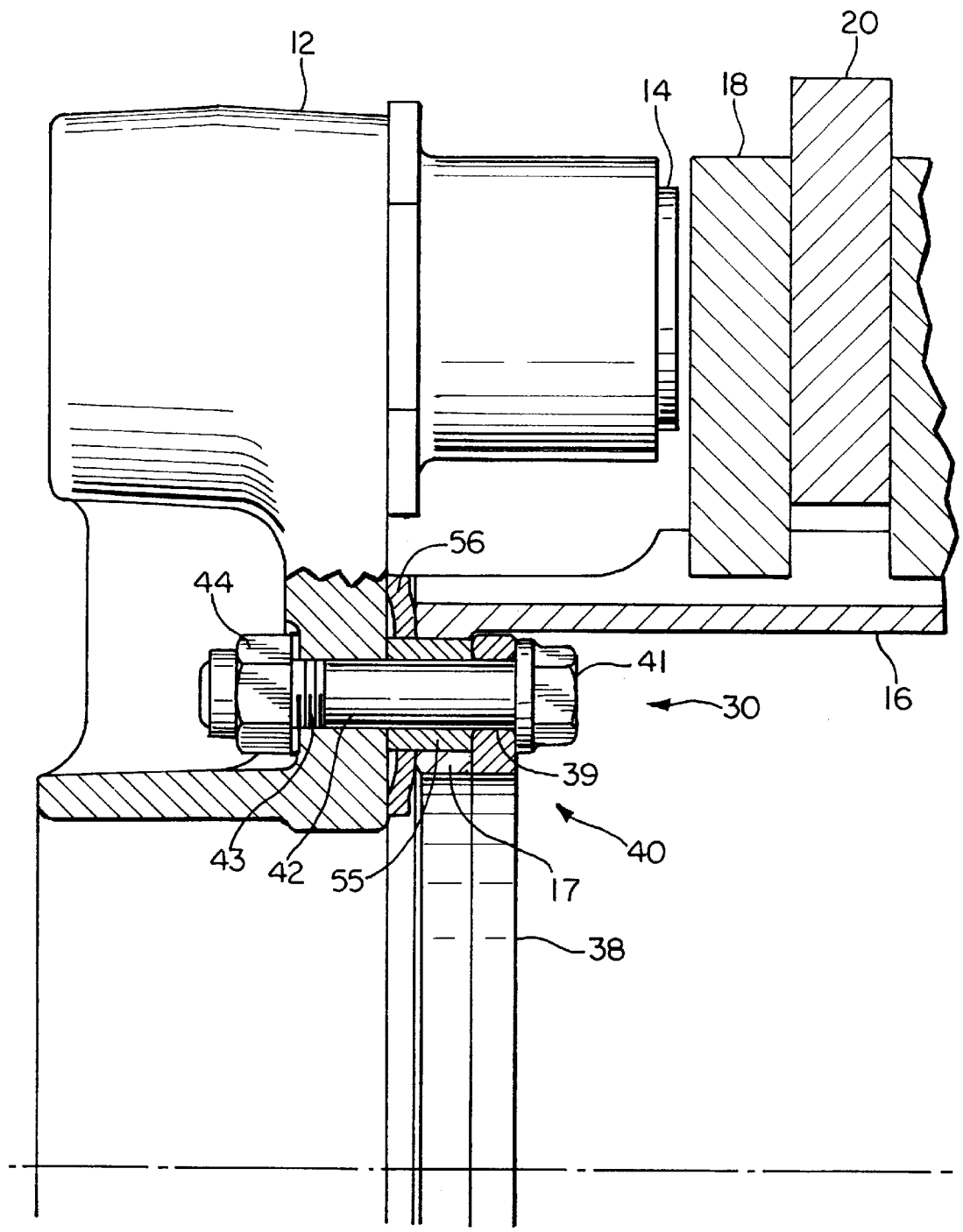

FIG. 4 illustrates an embodiment in which the piston housing 12 is attached to the torque tube 16 via the fastening mechanisms 30 that comprise the fasteners 40, bearing plate 38, bushing 55, and spring or resilient means 56. Because the damping force is proportional to the active brake pressure in the embodiments of FIGS. 1 and 4, the resilient means 56 can be located between the piston housing 12 and torque tube flange 17 to impart an additional constant damping force.

An experimental four rotor Boeing 767-300 brake utilizing carbon-carbon composite stator discs and rotor discs was tested to establish a vibration baseline. In each of five high-torque landing stops, a 250 Hz mode from 170 to 460

$g^2$/Hz was recorded with the standard brake structure. The carbon-carbon composite heat sink, (stator discs and rotor discs) was then placed in a brake constructed in accordance with the present invention. After completing 10 high-torque and 15 lesser torque stop sequences, the 250 Hz mode was not present. No vibration modes below 1,000 Hz were evident and no parts were damaged during the test.

The present invention provides a damping construction that may be utilized with existing standard multi-disc brake parts such as piston housings and torque tubes to effect efficiently vibration damping, without any significant increase in parts, weight or labor associated with the brake.

What is claimed is:

1. A multi-disc brake with vibration damping, comprising a piston housing connected with a torque tube, a first set of friction discs engaged with the torque tube, a second set of friction discs for engagement with a wheel, the torque tube connected to the piston housing by a plurality of fastening mechanisms, the fastening mechanisms each comprising a fastener extending through openings in a bearing plate, a bushing, and the piston housing, each opening in the torque tube receiving therein a respective bushing with the torque tube opening being larger than the bushing, the fastener compressing the bearing plate against the bushings which engage the piston housing and the bearing plate engaging the torque tube, whereby the larger openings in the torque tube permit slippage between the torque tube and bearing plate in order to dampen vibration during braking.

2. The brake in accordance with claim 1, wherein the bearing plate comprises a plurality of arcuate shaped plate segments.

3. The brake in accordance with claim 1, wherein the larger openings in the torque tube comprise elongated openings extending circumferentially relative to the torque tube.

4. The brake in accordance with claim 3, wherein the openings in the torque tube are located within a torque tube flange.

5. The brake in accordance with claim 1, wherein the larger openings in the torque tube comprise annular shaped openings disposed circumferentially about the torque tube.

6. The brake in accordance with claim 5, wherein the openings in the torque tube are located within a torque tube flange.

7. The brake in accordance with claim 1, wherein the fasteners comprise a plurality of nuts and bolts.

8. The brake in accordance with claim 1, wherein the bushing includes a flange which extends radially between the piston housing and the torque tube.

9. The brake in accordance with claim 1, wherein the fastening mechanism further comprises resilient means located between the piston housing and the torque tube, the resilient means providing a constant damping force between the piston housing and torque tube.

\* \* \* \* \*